US008051260B1

(12) United States Patent
McClure et al.

(10) Patent No.: US 8,051,260 B1
(45) Date of Patent: Nov. 1, 2011

(54) DETERMINING ENVIRONMENTAL AVAILABILITY IN A STORAGE SUBSYSTEM

(75) Inventors: Steven T. McClure, Northboro, MA (US); Scott B. Gordon, Upton, MA (US); Robert Decrescenzo, Franklin, MA (US); Timothy M. Johnson, Leicester, MA (US); Zhi-Gang Liu, Burlington, MA (US)

(73) Assignee: EMC Corporation, Hopkinton, MA (US)

( * ) Notice: Subject to any disclaimer, the term of this patent is extended or adjusted under 35 U.S.C. 154(b) by 914 days.

(21) Appl. No.: 10/881,131

(22) Filed: Jun. 30, 2004

(51) Int. Cl.
*G06F 11/22* (2006.01)
*G06F 11/273* (2006.01)

(52) U.S. Cl. ............ 711/161; 711/162; 714/24; 714/25; 714/30; 714/31; 714/42

(58) Field of Classification Search .......... 711/161–163; 714/5, 22, 42, 24, 25, 30, 31; 713/324, 340
See application file for complete search history.

(56) References Cited

U.S. PATENT DOCUMENTS

| | | | |
|---|---|---|---|
| 6,304,981 B1 * | 10/2001 | Spears et al. .................... 714/24 |
| 6,336,174 B1 * | 1/2002 | Li et al. ......................... 711/162 |
| 6,567,769 B2 * | 5/2003 | Chang ............................ 702/188 |
| 6,584,551 B1 * | 6/2003 | Huber ............................ 711/162 |
| 6,760,683 B2 * | 7/2004 | Yundt-Pacheco .............. 702/182 |
| 6,845,435 B2 * | 1/2005 | Nagasawa et al. ............. 711/162 |
| 6,978,347 B2 * | 12/2005 | Nakamura et al. ............. 711/114 |
| 7,013,380 B2 * | 3/2006 | Matsui et al. .................. 711/209 |
| 7,039,539 B2 * | 5/2006 | Espinoza-Ibarra et al. ..... 702/85 |
| 7,051,216 B2 * | 5/2006 | Suzuki et al. .................. 713/300 |
| 7,284,140 B2 * | 10/2007 | Suzuki et al. .................. 713/340 |
| 2004/0268166 A1 * | 12/2004 | Farkas et al. ................... 713/320 |
| 2005/0268170 A1 * | 12/2005 | Kearney et al. ................. 714/32 |

* cited by examiner

*Primary Examiner* — Sanjiv Shah
*Assistant Examiner* — Samuel Dillon
(74) *Attorney, Agent, or Firm* — Occhiuti Rohlicek & Tsao LLP

(57) ABSTRACT

A method for safeguarding data stored in a memory of a data storage system includes monitoring values of a subset of environmental variables associated with the data-storage system and updating a portion of a table containing values of environmental variables associated with the data-storage system. The table includes values for environmental variables that are not in the subset of environmental variables monitored. The values of the environmental variables are then inspected. On the basis of the inspection, a condition in which there exists a high-risk of data loss is determined.

31 Claims, 4 Drawing Sheets

DETERMINING ENVIRONMENTAL AVAILABILITY IN A STORAGE SUBSYSTEM

FIELD OF INVENTION

The invention relates to data-storage systems, and in particular, to safeguarding data stored in a volatile memory in the data system.

BACKGROUND

A data-storage system often includes a volatile cache for temporary storage of data that will ultimately be written to a disk. When a host requests that particular data be written, the data-storage system writes that data to the cache and notifies the host that the write is complete. A short time later, and without further interaction with the host, the data-storage system copies the data from the cache to a disk. Because a write to disk is so much slower than a write to cache, this two-stage procedure for data-storage has the advantage of concealing from the host the latency associated with writing to a disk.

A disadvantage of this two-stage procedure is that for a brief interval, the data only exists in a volatile memory. During this interval, an unexpected power interruption may result in loss of that data.

SUMMARY

In one aspect, the invention includes a method for safeguarding data stored in a memory of a data storage system. The method includes monitoring values of a subset of environmental variables associated with the data-storage system and updating a portion of a table containing values of environmental variables associated with the data-storage system. The table includes values for environmental variables that are not in the subset of environmental variables monitored. The values of the environmental variables are then inspected. On the basis of the inspection, a condition in which there exists a high-risk of data loss is determined.

In some practices, the subset of environmental variables includes variables having values indicative of availability of selected vault drives, power availability, and/or cooling fan operation.

The table can be accessed by either directly or indirectly accessing the memory.

Other practices of the invention include posting a message indicative of a high-risk condition.

Practices of the invention include those in which the determination of whether a high-risk condition exists includes determining availability of vault drives for storage of data in the memory, determining cooling fan availability, and/or determining power chain availability. Other practices include those in which determining whether a high-risk condition exists includes identifying a configuration of environmental variables indicative of prospective system failure, or identifying a configuration of environmental variables indicative of a prospective inability of available aggregate vault drive capacity to accommodate a selected quantity of data.

Once a high-risk condition has been identified, a pre-emptive shut down can be executed. This can include copying data from the memory into disk storage space designated for receiving data from the memory in the event of a pre-emptive shut down.

In another aspect, the invention includes a data-storage system having a first computer-readable medium for temporary storage of user data; a second computer-readable medium having information indicative of values of a plurality of environmental variables; and sentries having access to the second medium. Each sentry is configured to obtain values for a subset of the plurality of environmental variables and to update a corresponding portion of the information in the second computer-readable medium.

Embodiments of the data-storage system include those in which the first and second computer-readable media are first and second portions of a global memory.

Other embodiments include those having disk storage space designated for receiving a copy of the user data.

Yet other embodiments include those in which the sentries include at least one full-time sentry. The full-time sentry can be in indirect communication with the second computer-readable medium. This can be achieved by having the sentry communicate with an adapter that is in communication with the second computer-readable medium. However, in other embodiments, the full-time sentry is in direct communication with the second computer-readable medium.

Other embodiments of the data-storage system include those in which the sentries include at least one part-time sentry. The part-time sentry can be, for example, a disk adaptor or a host adaptor.

Embodiments of the data-storage system include those having first and second power chains for independently providing power to the first medium and those having second power chains for independently providing power to the disk storage space.

Another aspect of the invention includes a method for determining, in a data-storage system, when a high-risk of data loss exists for data stored in a memory. The method includes determining whether an aggregate capacity for storing a snapshot of the memory falls below a first selected threshold, determining whether an aggregate capacity for heat dissipation falls below a second selected threshold; and determining whether redundant power availability falls below a third selected threshold.

Certain practices of the invention include posting a message indicative of a high-risk condition if at least one of: the aggregate capacity for storing a snapshot; the average capacity for heat dissipation; and; the redundant power availability falls below its respective threshold.

In alternative practices of the invention, determining whether the aggregate capacity for storing a snapshot falls below a first threshold includes determining a number of vault drives available for storing at least a portion of the snapshot.

In other practices of the invention, determining whether the aggregate heat dissipation capacity falls below a second threshold includes determining the number of operational cooling fans in the data-storage system.

In yet other practices of the invention, determining whether redundant power availability falls below a third selected threshold includes determining the number of operational power chains supplying power to the data-storage system.

These and other features of the invention will be apparent from the following detailed description and the accompanying claims, in which:

DETAILED DESCRIPTION

Figure 1:
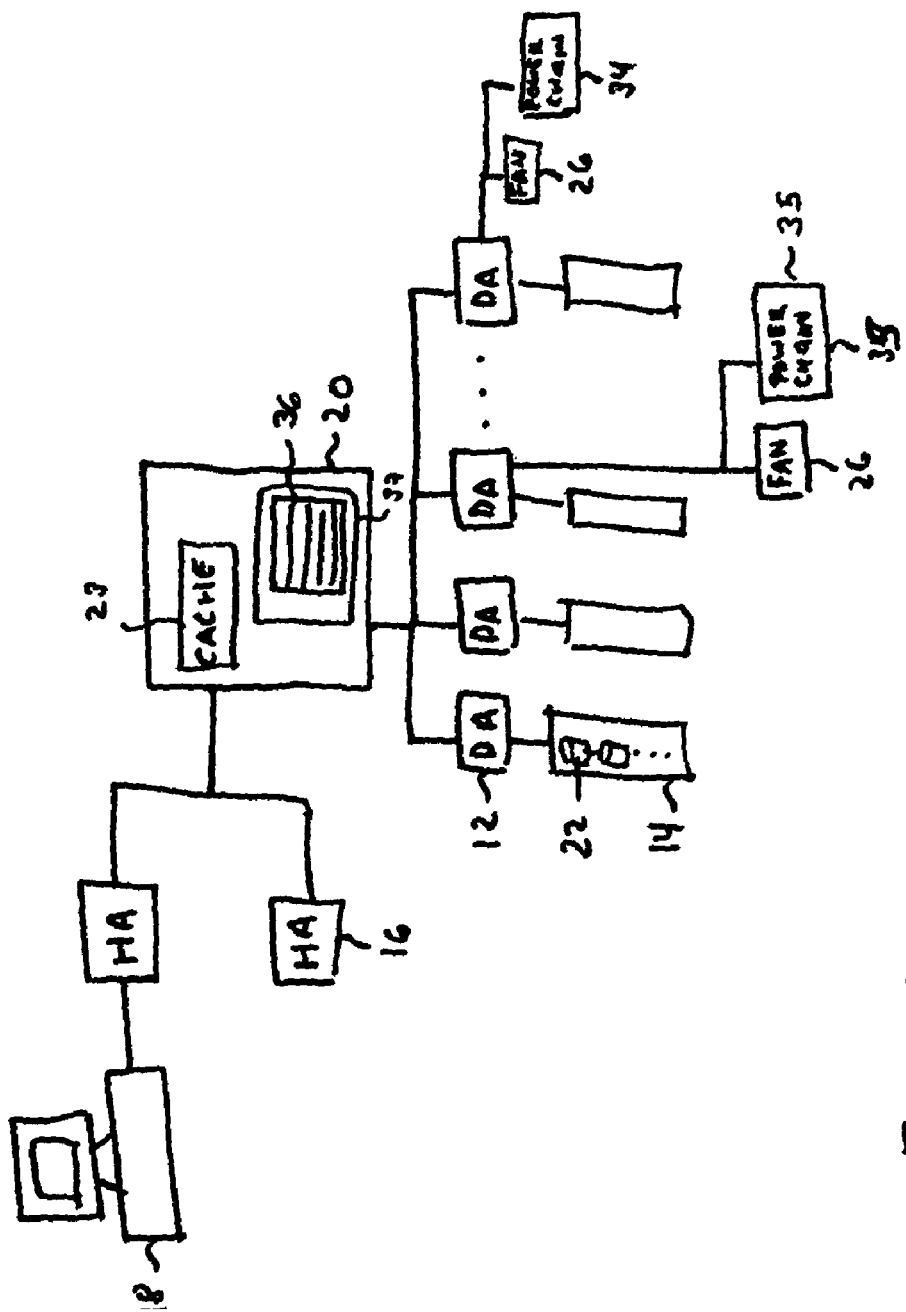
FIG. 1 is a logical view of a data-storage system having part-time sentries.

Referring to FIG. 1, a data-storage system 10 includes disk adaptors 12 in communication with corresponding disk arrays 14 of disks 22, and host adaptors 16 in communication with hosts 18. Each disk adaptor 12 and each host adaptor 16 is also in communication with a global memory 20. When a host 18 wishes to write data to a disk 22, its associated host adaptor 16 receives that data and temporarily stores it in a cache area 23 of the global memory 20. Once the data is in the cache area 23, the host adaptor 16 notifies the host 18 that the write is complete.

In fact, because the data has not yet been saved to a disk 22, the write has not truly been completed. It is the function of the disk adaptors 12 to consummate the write by identifying such data in the cache area 23 and de-staging it to an appropriate disk 22.

At any instant, therefore, the cache area 23 of the global memory 20 will contain a mixture of data that has not yet been saved in a disk 22 and data that has already been saved to a disk 22. The former will be referred to herein as "dirty data," and the latter will be referred to herein as "clean data." If the system unexpectedly loses power, the clean data can be recovered from disks 22. However, any dirty data that was in the cache area 23 may be lost.

Figure 2:
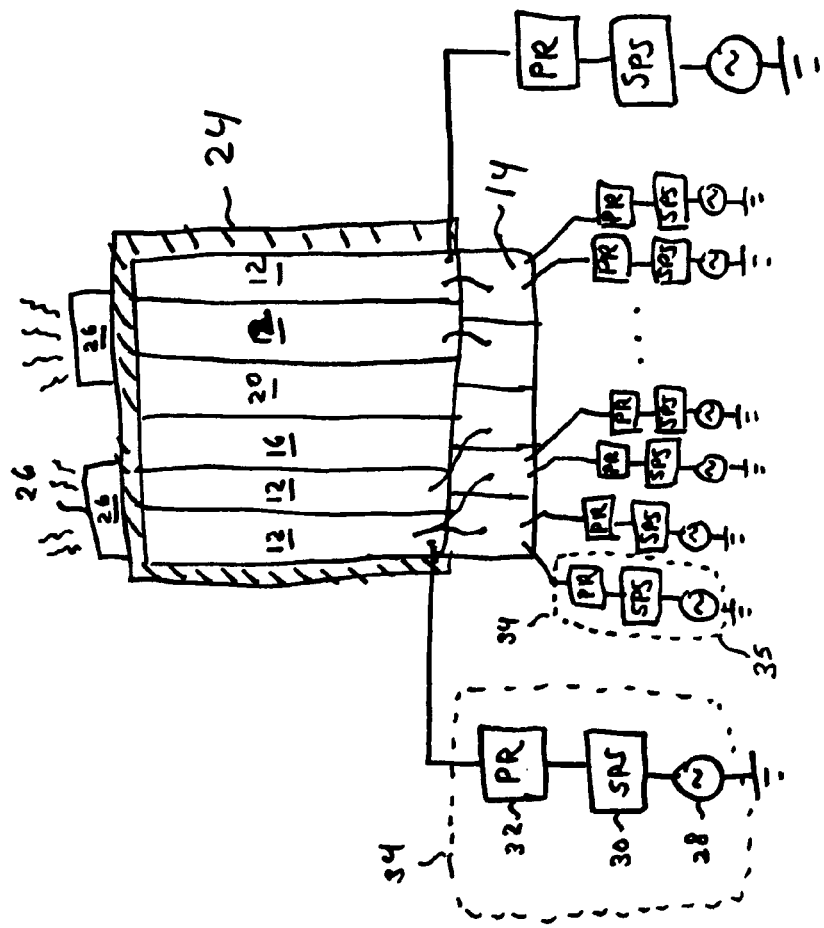
FIG. 2 shows the power supplies of a six card data-storage system.

Referring now to FIG. 2, cards containing the host adaptors 16, cards containing the global memory 20, and cards containing the disk adaptors 12, are all placed together in a card cage 24. Multiple fans 26 strategically disposed within the card cage 24 assist in dissipating heat generated by the cards 12, 16, 20. In the embodiment shown herein, there are two fans 26 at the top of the card cage 24. However, the number of fans 26 and their dispositions is a matter of design choice.

To reduce the likelihood of data loss caused by a power interruption, the data-storage system 10 connects to a pair of independent AC power sources 28. Each AC power source 28 connects to a supplemental power source 30 having a battery to supply back-up power should the AC power source 28 fail. Each supplemental power source 30 connects to a corresponding power regulator 32 that transforms the power supplied thereto into a DC voltage suitable for powering the cards 12, 16, 20 in the cage 24.

The cards 12, 16, 20 are thus configured to be powered by any one of two separate cage power-chains 34, each of which includes an AC power source 28, a supplemental power source 30, and a power regulator 32. The configuration of the cards 12, 16, 20 in the cage 24 is such that as long as one of the two cage power-chains 34 is operational, the cards 12, 16, 20 will have adequate power.

The disk arrays 14 are outside the card cage 24. Each disk array 14 is powered by two disk power-chains 35 of the type described above. Only one of the two disk power-chains 35 is required to power the disk array 14. In general, a particular disk adaptor 12 is in communication with one or more but not necessarily all, the disk arrays 14, and hence, one or more, but not all, disk power-chains 35.

Most disks 22 in a disk array 14 are used for routine I/O operations. However, certain disks in the disk arrays 14, or portions of certain disks, are reserved as "vault drives." In an emergency shut-down, all data in the cache area 23 of the global memory 20, both dirty data and clean data, is copied into the vault drives as quickly as possible. This avoids data loss that may result if the global memory 20 loses power before all dirty data stored in the cache area 23 thereof has been saved on a disk 22. The aggregate capacity of the vault drives is selected to accommodate the contents of the cache area 23, with room to spare in case one or more of the vault drives is unavailable when it is needed.

For the data-storage system 10 to avoid data loss, it must copy the contents of the cache area 23 into vault drives before it is too late to do so. To enable this to occur, the data-storage system 10 may declare a high-risk condition. Such a condition may be declared if, for example, a system failure is likely to occur. Such a condition may also be declared if there exists a prospective inability to copy all of the cache memory 20 to the vault drives. If the data-storage system 10 determines that a high-risk condition exists, it executes a pre-emptive shut-down, during which a snapshot of the contents of the cache area 23 of the global memory 20 is copied to the vault drives. By executing a pre-emptive shut-down, the data-storage system 10 avoids loss of dirty data in the cache area 23 of the global memory 20.

To determine when a high-risk condition exists, sentries on the data-storage system 10 monitor values of key environmental variables. Among the environmental variables to be monitored by sentries are fan variables that indicate whether corresponding fans 26 are operational, cage-power-chain variables that indicate whether corresponding cage power-chains 34 are supplying the cage 24 with power, and disk-power-chain variables that indicate whether corresponding disk power-chains 35 are providing power to the disk arrays 14.

The data-storage system 10 then identifies configurations of those environmental variables that are indicative of a high-risk condition. A salient feature of the data-storage system 10 is that the task of monitoring the environmental variables is distributed among several sentries, each of which can monitor some, but not all, of the environmental variables.

A sentry includes its own processor and local memory. Each sentry is in communication, either directly or indirectly, with a common area 37 of the global memory 20. Each sentry can therefore read data from the common area 37 of the global memory 20 and write data to the common area 37 in a manner independent of all other sentries. Moreover, each sentry can read what other sentries have written to the common area 37 of the global memory 20.

Certain sentries can perform tasks other than monitoring environmental variables. For example, any disk adaptor 12 or any host adaptor 16, both of which have access to the cache area 23 of the global memory 20 can be made to function as a "part-time" sentry by providing it with access to the common area 37 of the global memory 20. However, the tasks associated with functioning as a sentry can contribute noticeably to latency. As a result, it is usually undesirable to recruit a host adaptor 16 to be a part-time sentry, because any latency in a host adaptor 16 will be apparent to a host 18. For smaller systems, in which the I/O load is not too heavy, disk adaptors 12 can function as part-time sentries without excessive performance costs.

In larger systems, where even the disk adaptors 12 are too busy handling I/O to undertake sentry duty, it is often useful to include full-time sentries whose sole function is to monitor environmental variables and to access the common area 37 of the global memory 20 as needed. Unlike part-time sentries, full-time sentries do not require access to the cache area 27 of the global memory 20. A full-time sentry only requires access to the common area 37 of the global memory 20. Such access can be direct access, in which case the sentry is connected to a bus to which the global memory 20 is likewise connected. Or it can be indirect, in which case the sentry is connected to a disk adaptor 12, which carries out the actual access to the common area 37 of the global memory 20 on the sentry's behalf.

Periodically, each sentry, whether it is a full-time or part-time sentry, obtains values for those environmental variables that it is configured to monitor. After doing so, the sentry posts those values to a shut-down table 36 maintained in the common area 37 of the global memory 20. Each sentry thus updates its portion of the shut-down table 36 independently of the other sentries. Although no one sentry can update the entire table 36 by itself, collectively, the sentries asynchronously update the entire table 36.

Whenever a sentry updates its own portion of the shut-down table 36, it also scans the remaining portions of the table 36. In doing so, it determines whether the configuration of all the environmental variables is such that a high-risk condition should be declared. If a sentry determines that a high-risk condition may exist, it posts a message indicating that such is the case.

Figure 3:
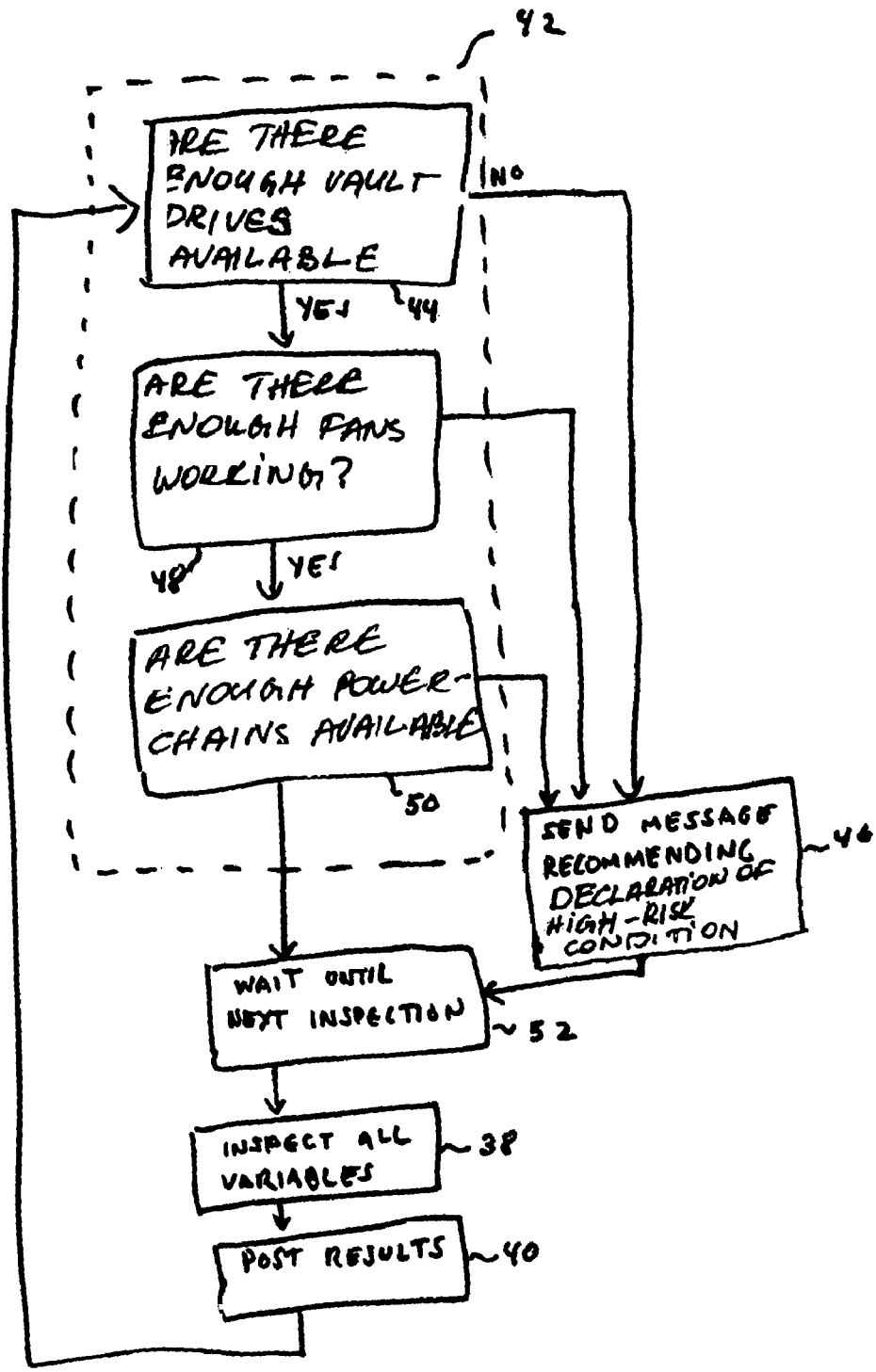
FIG. 3 is a flow chart of a procedure carried out by a particular sentry in the data-storage system of FIG. 2.

Referring to FIG. 3, each sentry obtains values of all environmental variables that it is configured to obtain (step 38). The sentry then posts those values to the shut-down table (step 40). Then, the sentry inspects the shut-down table (step 42), including those values that were posted by other sentries. In doing so, each sentry attempts to identify patterns of environmental variables that may be indicative of a high-risk condition.

Specifically, the sentry determines whether sufficient aggregate vault drive capacity is available for storing a snapshot of the contents of the global memory 20 (step 44). In particular, the sentry counts how many vault drives are available. This includes inspecting the disk-power-chain variables. If the number of available vault drives is insufficient to accommodate the capacity of the cache area 23 of the global memory 20, the sentry recommends declaration of a high-risk condition (step 46). Otherwise, the sentry proceeds to inspect the fan variables to determine the number of operating fans 26 (step 48). If the number of operating fans 26 is less than a pre-defined threshold, the sentry recommends declaration of a high-risk condition (step 46). Otherwise, the sentry proceeds to inspect the cage-power-chain variables to determine how many cage power-chains 34 are operational (step 50). If the number of operational cage power-chains falls below a threshold, the sentry recommends declaration of a high-risk condition (step 46). Otherwise, the sentry proceeds to wait until the next cycle to refresh the new values for all its environmental variables (step 52).

In the illustrated embodiment, the sentry recommends declaration of a high risk condition when any one of the following conditions is met: fewer than half the cage power-chains are operational; fewer than half of the fans are operational; and the number of available vault drives is fewer than or equal to half of what is needed to accommodate the capacity of the cache area 23.

Note that the sentries themselves do not initiate a pre-emptive shut down. They merely send messages (step 46) that amount to recommendations for a pre-emptive shut-down. Other software executing on the data-storage system 10 will receive these messages and take action if appropriate. In some cases, that software will initiate a pre-emptive shut-down upon receiving a single message from one sentry. In other cases, to reduce false alarms, the software will only initiate a shut-down after several sentries have sent such messages within a specified period.

In the embodiment shown in FIGS. 1 and 2, there are no full-time sentries. All sentry duties are distributed among the disk adaptors 12. In particular, each disk adaptor 12 monitors the disk power-chains 35 associated with disk arrays 14 to which it is connected. Two of the disk adaptors 12, however, have additional sentry duties. In addition to monitoring their associated disk power-chains 35, these disk adaptors 12 also monitor both the cage power-chains 34 and the fans 26.

Figure 4:
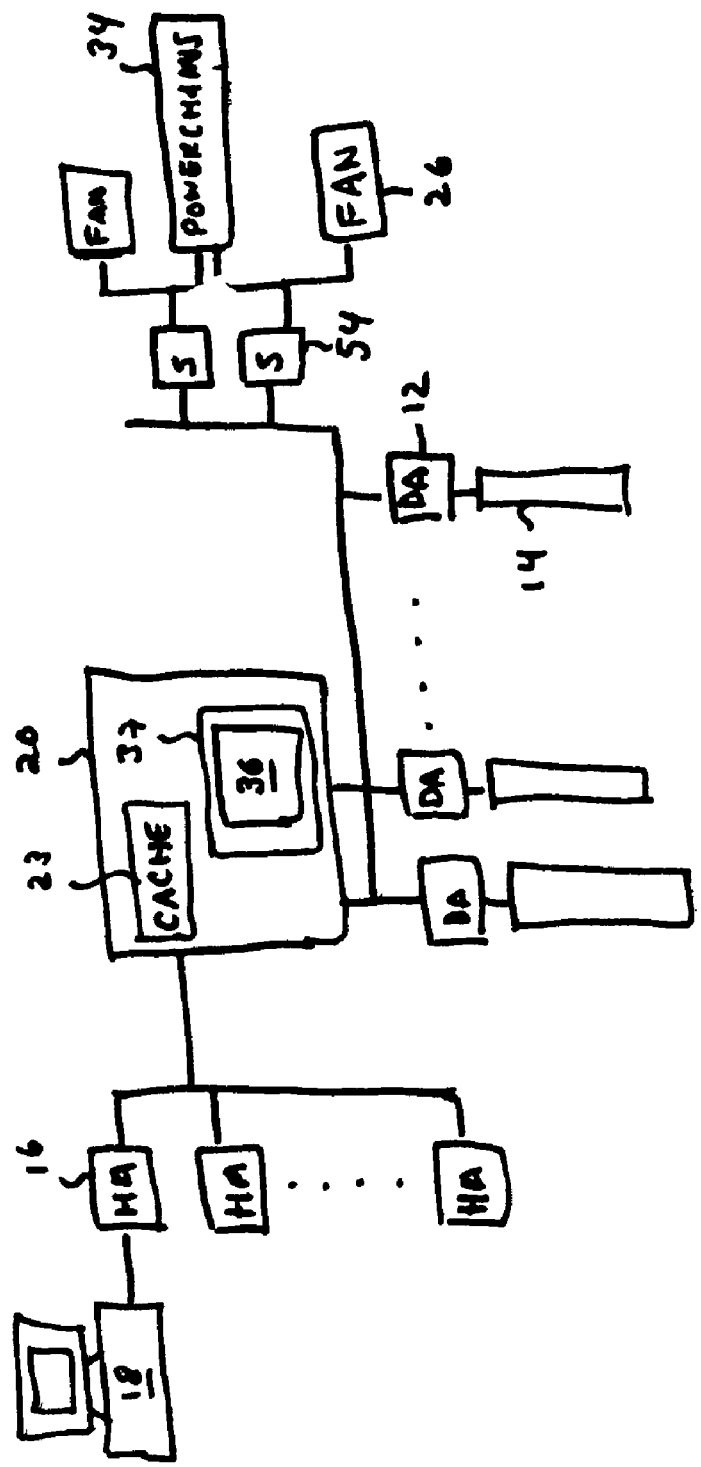
FIG. 4 is a logical view of a data-storage system that has both full-time and part-time sentries.

An alternative embodiment, shown in FIG. 4, includes many more cards 12, 16, 20. In this embodiment, eight cage power-chains 34 supply the card cage 24 with power. Each cage power-chain 34 includes an AC source 28 (shared with three other cage power-chains), a supplemental power supply 30, and a power regulator 32. The configuration of cards 12, 16, 20 is such that adequate power will be available with four of the eight cage power-chains 34 operational.

The embodiment in FIG. 4 features a pair of full-time sentries 54 dedicated to monitoring the fans 26 and the cage power-chains 34. The disk adaptors 12 in FIG. 4 continue to monitor the disk power-chains 35 associated with their respective disk arrays 14. Both the full-time sentries 54 and the disk adaptors 12 carry out the process shown in FIG. 3.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Having described the invention, and a preferred embodiment thereof, what is claimed as new and secured by Letters Patent is:

1. In a data-storage system, a method for safeguarding dirty data stored in a memory, the method comprising:
 using a first sentry, monitoring values of a first subset of environmental variables associated with the data-storage system,
 using a second sentry that is different from the first sentry, concurrently monitoring values of a second subset of environmental variables associated with the data-storage system, the second subset being different from the first subset,
 using the first sentry, updating a first portion of a table containing values of environmental variables associated with the data-storage system, wherein the first portion can be updated only by the first sentry and not by the second sentry,
 using the second sentry, updating a second portion of the table containing values of environmental variables associated with the data-storage system, wherein the second portion can be updated only by the second sentry and not by the first sentry,
 wherein the first portion of the table includes values of environmental variables from the first subset, and
 wherein the second portion of the table includes values of environmental variables from the second subset,
 causing the first sentry to inspect the values of the environmental variables contained in the first portion of the table, the environmental variables in the first portion of the table having been updated by the first sentry;
 causing the first sentry to inspect the values of the environmental variables contained in the second portion of the table, the environmental variables in the second portion of the table having been updated by the second sentry and not the first sentry,
 on the basis of the inspection, determining that a high-risk condition exists; and
 in response to detecting that a high-risk condition exists, copying dirty data from the memory into a vault drive.

2. The method of claim 1, wherein at least one of the first and second proper subsets of environmental variables includes variables having values indicative of availability of selected vault drives.

3. The method of claim 1, wherein at least one of the first and second proper subsets of environmental variables includes variables having values indicative of power availability.

4. The method of claim 1, wherein at least one of the first and second proper subsets of environmental variables includes variables having values indicative of cooling fan operation.

5. The method of claim 1, further comprising directly accessing the memory to obtain access to the table.

6. The method of claim 1, further comprising indirectly accessing the memory to obtain access to the table.

7. The method of claim 1, wherein determining whether a high-risk condition exists comprises determining availability of vault drives for storage of data in the memory.

8. The method of claim 1, wherein determining whether a high-risk condition exists comprises determining cooling fan availability.

9. The method of claim 1, wherein determining whether a high-risk condition exists comprises determining power chain availability.

10. The method of claim 1, further comprising posting a message indicative of a high-risk condition.

11. The method of claim 1, wherein determining whether a high-risk condition exists comprises identifying a configuration of environmental variables indicative of prospective system failure.

12. The method of claim 1, wherein determining whether a high-risk condition exists comprises identifying a configuration of environmental variables indicative of a prospective inability of available aggregate vault drive capacity to accommodate a selected quantity of data.

13. The method of claim 1, further comprising executing a pre-emptive shut down at least in part on the basis of a determination that a high-risk condition exists.

14. The method of claim 13, wherein executing a pre-emptive shut down comprises copying data from the memory into disk storage space designated for receiving data from the memory in the event of a pre-emptive shut down.

15. A data-storage system comprising:
a first computer-readable medium for temporary storage of user data, the user data including clean data and dirty data;
a second computer-readable medium having information indicative of values of a plurality of environmental variables;
a first sentry having access to the second computer-readable medium, the first sentry being configured to obtain values for a first subset of said plurality of environmental variables and to update a first portion of the information in the second computer-readable medium, wherein only the first sentry can update the first portion;
a second sentry having access to the second computer-readable medium, the second sentry being configured to obtain values for a second subset of said plurality of environmental variables and to update a second portion of the information in the second computer-readable medium, wherein only the second sentry can update the second portion;
wherein the first and second portions differ from each other;
wherein the first and second subsets differ from each other; and
a third computer-readable medium having capacity sufficient for storing the dirty data stored in the first computer-readable medium.

16. The system of claim 15, wherein the first and second computer-readable media comprise first and second portions of a global memory.

17. The system of claim 16, wherein the third computer-readable medium comprises a vault drive designated for receiving a copy of the user data.

18. The system of claim 15, wherein the first and second sentries comprise at least one full-time sentry.

19. The system of claim 18, wherein the at least one full-time sentry is in indirect communication with the second computer-readable medium.

20. The system of claim 19, wherein the full-time sentry is in communication with an adapter that is in communication with the second computer-readable medium.

21. The system of claim 15, wherein the first and second sentries comprise at least one part-time sentry.

22. The system of claim 21, wherein the at least one part-time sentry comprises a disk adaptor in communication with the first computer-readable medium for copying dirty data into the third computer-readable medium.

23. The system of claim 15, further comprising first and second power chains for independently providing power to the first medium.

24. The system of claim 17, further comprising first and second power chains for independently providing power to the disk storage space.

25. In a data-storage system, a method for determining when a high-risk of data loss exists for data stored in a memory, the method comprising:
causing a sentry to inspect values of environmental variables contained in a first portion of a computer-readable medium having information indicative of values of a plurality of environmental variables, wherein the first portion cannot be updated by the sentry, and
based on the inspection:
determining whether an aggregate capacity for storing a snapshot of the memory falls below a first selected threshold;
determining whether an aggregate capacity for heat dissipation falls below a second selected threshold; and
determining whether redundant power availability falls below a third selected threshold, and
on the basis of any one or more of the foregoing determining steps, determining that a high-risk of data loss exists for data stored in the memory.

26. The method of claim 25, further comprising posting a message indicative of a high-risk condition if at least one of
the aggregate capacity for storing a snapshot
the aggregate capacity for heat dissipation; and
the redundant power availability falls below its respective threshold.

27. The method of claim 25, wherein determining whether the aggregate capacity for storing a snapshot falls below a first selected threshold comprises determining a number of vault drives available for storing at least a portion of the snapshot.

28. The method of claim 25, wherein determining whether the aggregate heat dissipation capacity falls below a second selected threshold comprises determining the number of operational cooling fans in the data-storage system.

29. The method of claim 25, wherein determining whether redundant power availability falls below a third selected threshold comprises determining the number of operational power chains supplying power to the data-storage system.

30. Non-transitory computer-readable media having encoded thereon software for causing first and second sentries to execute instructions for
- using a first sentry, monitoring values of a first subset of environmental variables associated with the data-storage system,
- using a second sentry that is different from the first sentry, concurrently monitoring values of a second subset of environmental variables associated with the data-storage system, the second subset being different from the first subset,
- using the first sentry, updating a first portion of a table containing values of environmental variables associated with the data-storage system, wherein the first portion can be updated only by the first sentry and not by the second sentry,
- using the second sentry, updating a second portion of the table containing values of environmental variables associated with the data-storage system, wherein the second portion can be updated only by the second sentry and not by the first sentry,
- wherein the first portion of the table includes values of environmental variables from the first subset, and
- wherein the second portion of the table includes values of environmental variables from the second subset,
- causing the first sentry to inspect the values of the environmental variables contained in the first portion of the table, the environmental variables in the first portion of the table having been updated by the first sentry;
- causing the first sentry to inspect the values of the environmental variables contained in the second portion of the table, the environmental variables in the second portion of the table having been updated by the second sentry and not the first sentry,
- on the basis of the inspection, determining that a high-risk condition exists; and
- in response to detecting that a high-risk condition exists, copying dirty data from the memory into a vault drive.

31. A non-transitory computer-readable medium having encoded thereon software for causing a sentry to execute instructions for
- causing a sentry to inspect values of environmental variables contained in a first portion of a computer-readable medium having information indicative of values of a plurality of environmental variables, wherein the first portion cannot be updated by the sentry, and
- based on the inspection:
- determining whether an aggregate capacity for storing a snapshot of the memory falls below a first selected threshold;
- determining whether an aggregate capacity for heat dissipation falls below a second selected threshold; and
- determining whether redundant power availability falls below a third selected threshold, and
- on the basis of any one or more of the foregoing determining steps, determining that a high-risk of data loss exists for data stored in the memory.

* * * * *